United States Patent Office 3,294,839
Patented Dec. 27, 1966

3,294,839
PURIFICATION OF TRIMELLITIC ACID
Thomas Michael Binns Wilson, Cottingham, England, assignor to The Distillers Company Limited, Edinburgh, Scotland, a British company
No Drawing. Filed Dec. 16, 1963, Ser. No. 330,619
Claims priority, application Great Britain, Jan. 4, 1963, 456/63
5 Claims. (Cl. 260—525)

The present invention relates to the purification of polycarboxylic acids, and in particular to the purification of aromatic polycarboxylic acids which have been produced by the oxidation of aromatic hydrocarbons.

Aromatic polycarboxylic acids which have been prepared by the oxidation of aromatic hydrocarbons with nitric acid, or by a process which includes the step of oxidation with nitric acid, may be unacceptable in quality as a result of the presence of nitrogenous impurities. Thus, for example, trimellitic acid which has been produced by the oxidation of pseudocumene with nitric acid contains small amounts of combined nitrogen which are difficult to remove. Since this acid is useful in the preparation of higher alkyl esters thereof for use as plasticisers, it is necessary to remove nitrogenous impurities from the acid before esterifications, to avoid the development of unacceptable colours in the product ester.

According to the present invention, the process for the purification of an aromatic polycarboxylic acid, which has been prepared from an aromatic hydrocarbon by a process including a nitric acid oxidation step, comprises washing the aromatic polycarboxylic acid with an alkyl ester having not less than four carbon atoms in the molecule, exclusive of carboxyl carbon or an aliphatic ketone having not less than five carbon atoms in the molecule exclusive of carbonyl carbon. Particularly desirable solvents are saturated esters having five to eight carbon atoms exclusive of carboxyl carbon and saturated aliphatic ketones having from five to eight carbon atoms exclusive of carbonyl carbon.

The washing process may suitably be carried out at temperatures at which the solvent is in the liquid phase and the acid is in the solid phase; temperatures within the range 0° to 200° C. are normally satisfactory, for example, for the purification of trimellitic acid. While a single washing step improves the quality of the acid substantially, it is preferred to carry out the washing with two or more increments of solvent.

The washing is carried out using a solvent as defined above. Suitable solvents include for example, butyl, amyl, hexyl and heptyl acetates, having both straight and branched chains, propyl, butyl, amyl and hexyl propionates having straight and branched chains and ketones having the formula $R_1.CO.R_2$ when $R_1$ and $R_2$ are alkyl groups having from one to seven carbon atoms, the total number of carbon atoms in the groups $R_1$ and $R_2$ being not less than five, and preferably not more than eight. Suitable groups for both $R_1$ and $R_2$ include methyl, ethyl, propyl, isopropyl, n-butyl, isobutyl, n-amyl and isoamyl. Preferred solvents include isobutyl acetate and methyl isobutyl ketone, and the process is preferably applied to the purification of aromatic polycarboxylic acids having at least three carboxyl groups, such as trimellitic acid, produced by the nitric acid oxidation of pseudocumene.

The process of the invention is illustrated by the following examples.

EXAMPLE 1

A sample of crude trimellitic acid obtained by the nitric acid oxidation of pseudocumene had an equivalent weight of 72 (theoretical 70) and contained 0.32% by weight of combined nitrogen. Triiso-octyl trimellitate obtained from this acid had a colour of 1.3 yellow units and 0.1 red units measured on the Lovibond scale using a one inch cell, and this colour was unacceptable for a plasticiser. The colour was not removed by bleaching with potassium permanganate.

150 g. of this crude acid was washed at a temperature of 70° C. with three increments of 100 millilitres of methyl isobutyl ketone, whereupon it was found that the washings were colourless. The residual acid was dried at 110° C. to give a white solid weighing 128.5 g. and having an equivalent weight of 69.6. The combined nitrogen content of the product was only 0.06% by weight.

Triiso-octyl trimellitate obtained from the purified acid was considerably improved in colour, and the residual colour was removable by bleaching with potassium permanganate. The final product ester had a colour of 0.3 yellow Lovibond units measured in a 1" cell.

EXAMPLE 2

200 g. of crude acid was washed at room temperature with three portions of 100 ml. of isobutyl acetate; the final washings were colourless. The residual acid was dried at 110° C. to give a white solid (183 g.) having an equivalent weight of 70.

Triiso-octyl trimellitate obtained from the purified acid had an improved colour; the residual colour was removed by bleaching with potassium permanganate. The product ester had a colour of 1.5 Y Lovibond units in a 6" cell.

I claim:
1. The process for the purification of trimellitic acid which has been prepared by the oxidation of pseudocumene by a process including a nitric acid oxidation step, which comprises washing the aromatic polycarboxylic acid with an organic solvent selected from the group consisting of alkyl esters having from five to eight carbon atoms in the molecule exclusive of carboxyl carbon, and aliphatic ketones having from five to eight carbon atoms in the molecule, exclusive of carbonyl carbon at a temperature within the range in which the washing solvent is in the liquid phase, and the trimellitic acid is in the solid phase.
2. The process as claimed in claim 1 in which the solvent is isobutyl acetate.
3. The process as claimed in claim 1 in which the solvent is methyl isobutyl ketone.
4. The process as claimed in claim 1 in which the aromatic polycarboxylic acid is washed at a temperature within the range from 0° to 200° C.
5. A process for the purification of trimellitic acid which has been prepared by the oxidation of pseudocumene by a process including a nitric acid oxidation step, which comprises washing the aromatic polycarboxylic acid with at least two increments of an organic solvent selected from the group consisting of butyl, amyl, hexyl, heptyl acetates, propyl, butyl, amyl, hexyl propionates and ketones of the formula:

$$R_1COR_2$$

wherein $R_1$ and $R_2$ are each methyl, ethyl, propyl, isopropyl, n-butyl, isobutyl, n-amyl or isoamyl with the proviso that the total number of carbon atoms in $R_1$ and $R_2$ is not less than five or more than eight at a temperature of from 0° C. to 200° C.

References Cited by the Examiner
UNITED STATES PATENTS
2,726,262   12/1955   Grosskinsky et al. ___ 260—525
FOREIGN PATENTS
797,726   7/1958   Great Britain.

LORRAINE A. WEINBERGER, *Primary Examiner.*
S. B. WILLIAMS, *Assistant Examiner.*